United States Patent [19]

Dwyer

[11] 4,256,429

[45] Mar. 17, 1981

[54] APPARATUS FOR HANDLING SIGNATURE BUNDLES

[75] Inventor: Robert E. Dwyer, Madison Heights, Mich.

[73] Assignee: D. W. Zimmerman Mfg., Inc., Madison Heights, Mich.

[21] Appl. No.: 37,460

[22] Filed: May 9, 1979

[51] Int. Cl.[3] .......................... B65G 7/00; B66C 1/44

[52] U.S. Cl. .............................. 414/626; 294/67 BB; 294/88; 294/103 R; 414/763; 414/783

[58] Field of Search ................. 294/34, 67 BB, 81 R, 294/86 R, 86 LS, 87 R, 88, 103 R, DIG. 2; 414/590, 618, 620, 621, 622, 626, 763, 771, 780, 783, 784

[56] References Cited

U.S. PATENT DOCUMENTS

| | | | |
|---|---|---|---|
| 2,390,293 | 12/1945 | Colson | 414/783 X |
| 2,647,650 | 8/1953 | Sherriff | 294/88 X |
| 2,871,052 | 1/1959 | Neher | 294/67 BB X |
| 2,874,990 | 2/1959 | Janoff | 294/67 BB X |
| 3,015,514 | 1/1962 | Mezger | 294/86 R |
| 3,670,912 | 6/1972 | Dunbar | 294/88 X |
| 4,051,966 | 10/1977 | Cotton | 294/DIG. 2 X |
| 4,111,310 | 9/1978 | Stobb | 294/86 R X |

FOREIGN PATENT DOCUMENTS

| | | | |
|---|---|---|---|
| 40741 | 1/1969 | Finland | 414/783 |

*Primary Examiner*—Johnny D. Cherry
*Attorney, Agent, or Firm*—Allen D. Gutchess, Jr.

[57] ABSTRACT

Apparatus is provided for handling signature bundles. The apparatus includes an inverted U-shaped frame with legs rotatably carrying clamping pads. The frame has a fluid-operated ram thereon for moving one leg toward and away from the other. One clamping pad is connected to a driven sprocket engaged by a chain. The chain is connected to a drive sprocket mounted on a drive shaft of a motor which is mounted on the frame. The frame also has a locator plate to aid in centering the clamping pads with the signature bundles.

3 Claims, 4 Drawing Figures

APPARATUS FOR HANDLING SIGNATURE BUNDLES

This invention relates to apparatus for handling signature bundles and includes power means for rotating the bundles and locating means for centering the apparatus with respect to the bundles.

In the printing and graphic arts industries, apparatus is employed to clamp and lift bundles of signatures and transport them from stacking equipment which stacks the signatures in bundles to feeding equipment which separates and collates the bundles. The stacking equipment positions the signatures with folded edges at one side of the bundles and the bundles frequently have to be turned to reposition the folded edges at the feeding equipment.

Heretofore, the operator has turned the bundles by hand when reorientation of the folded edges of the signatures is necessary. The hundreds of signatures in the bundles are heavy and substantial effort is required to turn them. Further, if force is placed on intermediate portions of the bundles to turn them, the signatures may squirt out of the apparatus with disastrous results.

The present invention provides apparatus for handling signature bundles with power rotating means. Clamping pads which engage the ends of the bundles are rotatably held by legs of the apparatus and one of the clamping pads is driven by a reversible motor and a mechanical drive train.

A locator plate is also carried by the frame of the apparatus to contact the bundles and to aid in centering them with respect to the apparatus. The locator plate is then retracted to enable the bundles to be rotated.

It is, therefore, a principal object of the invention to provide apparatus for handling signature bundles and to power rotate them.

Another object of the invention is to provide apparatus for handling signature bundles with locating means for centering the apparatus with respect to the bundles.

Many other objects and advantages of the invention will be apparent from the following detailed description of a preferred embodiment thereof, reference being made to the accompanying drawings, in which.

Figure 1:
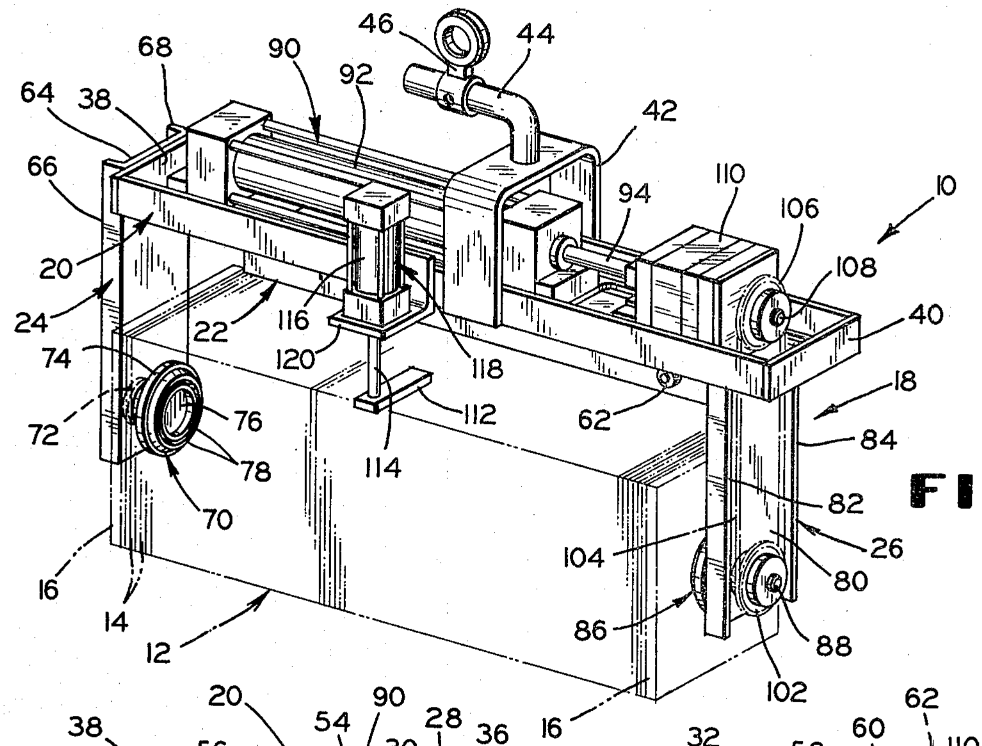
FIG. 1 is a somewhat schematic view in perspective of apparatus embodying the invention shown engaging a signature bundle.
Figure 2:
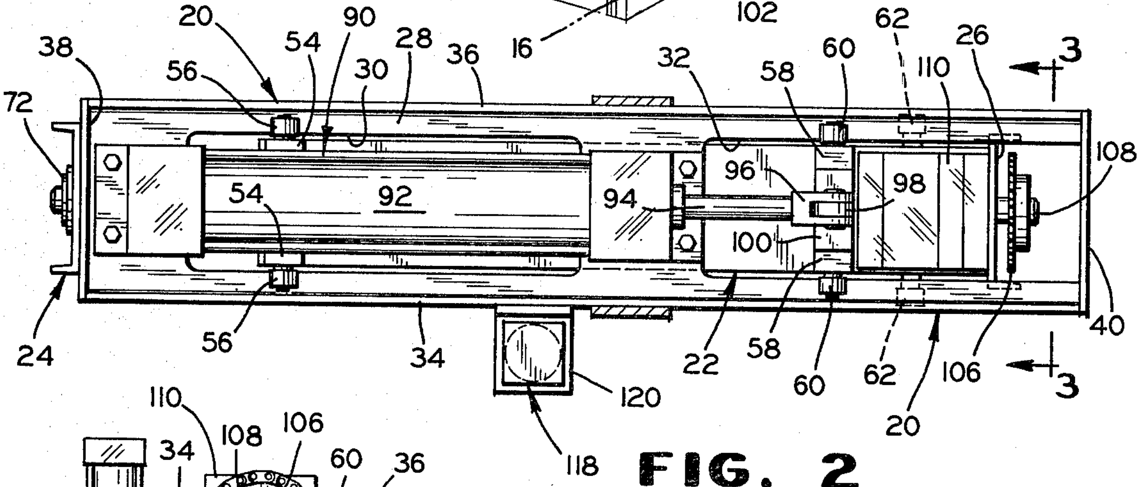
FIG. 2 is a top view of the apparatus in FIG. 1.
Figure 3:
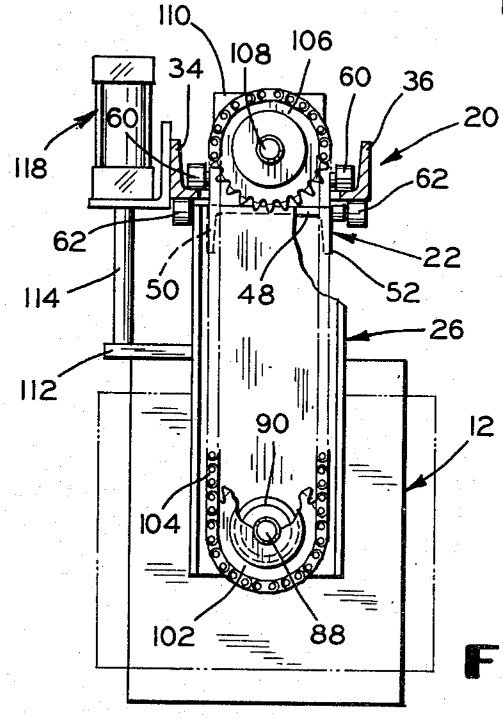
FIG. 3 is a view in transverse cross section taken along the line 3—3 of FIG. 2.
Figure 4:
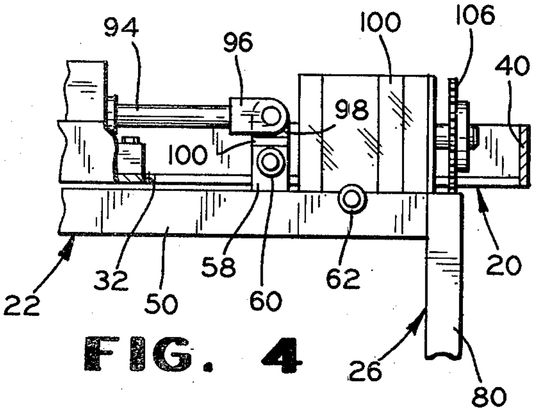
FIG. 4 is a fragmentary side view, with parts broken away and with parts in section, of the apparatus.

Referring to the drawings, and particularly to FIG. 1, signature bundle-handling apparatus is indicated at 10 and is shown engaging a signature bundle 12 which includes a multiplicity of signatures 14 and end plates 16. All of the signatures 14 have their folded edges commonly oriented.

The apparatus 10 includes a generally inverted U-shaped frame indicated at 18. The frame 18 includes a stationary horizontal frame member 20, a movable horizontal frame member 22, an upright stationary leg 24, and an upright movable leg 26. The stationary horizontal frame member has a horizontal plate 28 with elongate openings 30 and 32 and side flanges 34 and 36. End plates 38 and 40 extend between the flanges 34 and 36. An inverted U-shaped connector 42 has legs affixed to the flanges 34 and 36 at intermediate portions thereof with an L-shaped bar 44 extending upwardly to a hoist loop 46. The loop 46 is located approximately over the center of gravity of the apparatus 10 when clamped with the bundle 12 and is connected to a suitable overhead hoist for carrying the bundle 12.

The movable horizontal frame member 22 includes a horizontal plate 48 and side flanges 50 and 52 extending downwardly therefrom. The horizontal frame member 22 is movably supported from the frame member 20 by upwardly extending blocks 54 at one end of the frame member 22 extending through the elongate opening 30 and having rollers 56 which ride on the plate 28 of the frame member 20. Near the other end of the frame member 22, blocks 58 extend upwardly through the elongate opening 32 and have rollers 60 riding on the horizontal plate 28. The frame member 22 also has lower rollers 62 extending outwardly from the flanges 50 and 52 and engaging the bottom of the plate 28 near the flanges 34 and 36.

The upright stationary leg 24 has a plate 64, the upper end of which is affixed to the end plate 38 of the stationary frame member 20, and has side flanges 66 and 68 extending outwardly therefrom. A circular clamping pad 70 is rotatably carried in a bearing 72 near the lower end of the upright leg 24. The clamping pad 70 has a metal backup plate 74 and a rubber plate 76 with circular ridges 78 extending therefrom to securely engage the end of the signature bundle 12.

The movable upright frame member 26 includes a plate 80 affixed to ends of the plate 48 and the flanges 50 and 52 of the horizontal frame member 22 and has outwardly extending flanges 82 and 84. A clamping pad 86 is located near the lower end of the movable upright leg 26 and has a shaft 88 extending through a bearing 90 in the plate 80. Otherwise the clamping pad 86 is constructed the same as the pad 70.

For moving the movable upright leg 26 toward and away from the stationary upright leg 24, a fluid-operated ram 90 is connected between the frame members 20 and 22. The ram includes a cylinder 92 mounted on the stationary frame member 20 and a piston rod 94. The rod 94 has a clevis 96 pivotally connected to an ear 98 extending upwardly from a web 100 which extends between the roller blocks 58. When fluid is supplied to the rod end of the piston in the cylinder 92, the piston rod 94 is retracted to move the movable horizontal frame member 22 and the movable upright leg 26 toward the leg 24 to move the clamping pad 86 toward the pad 70, thereby to engage the end plates 16 of the signature bundle 12 and clamp the signatures 14 therebetween in a firm manner. When the bundle 12 has been transported to the desired location and positioned in place with the folded edges of the signatures 14 properly oriented, fluid is supplied to the blind end of the cylinder 92 to extend the piston rod 94 and release the clamping pads 70 and 86 from the bundle.

Heretofore, when it was desired to turn the bundle 12 to reorient the folds of the signatures 14, the operator turned the bundle by hand. Since the bundle 12 has considerable weight, it required some effort to turn the bundle. Skilled operators could offset this to some extent by grasping the bundle by means of the clamps in an off-center position so that the weight of the bundle could help turn it. However, this increased the possibility of the signatures squirting out of the apparatus. Also, if the bundle were pushed by the operator at an intermediate portion to turn it, this also increased the possibility of the signatures squirting out.

To overcome these problems, the apparatus 10 embodying the invention is equipped with means for power rotating the bundles 12. Accordingly, the clamping pad 86 is powered and has a circular driven member 102 in the form of a sprocket or pulley affixed to the shaft 88 on the side of the movable upright leg 26 opposite the clamping pad 86. An endless flexible member 104 in the form of a chain or V-belt engages the circular driven member 102 and extends upwardly therefrom the a circular drive member 106 in the form of a sprocket or pulley. The drive member 106 is affixed to a drive shaft 108 of a suitable reversible motor 110 which is mounted on the plate 48 of the movable horizontal frame member 22. When the motor 110 is operated, it relatively slowly rotates the drive sprocket 106 which rotates the driven sprocket 102 and the clamping pad 86. This causes the bundle to rotate with the clamping pad 70 simultaneously rotating.

To aid in centering the bundle 12 with respect to the apparatus 10 and specifically with respect to the clamping pads 70 and 86, a locator plate 112 can be employed. The apparatus 10 is then lowered until the plate 112 contacts the top of the signatures 14 of the bundle 12. The locator plate 112 is mounted on the end of a piston rod 114 extending from a cylinder 116 of a fluid-operated ram 118. The ram 118 is mounted on a suitable bracket 120 which is affixed to the stationary horizontal frame member 20. After the bundle is centered by means of the locator plate 112, the plate is retracted to an upper position to enable the bundle 12 to be turned. The cylinder 116 can have a spring return. Suitable valves can be employed to supply fluid to both ends of the cylinder 92 and to the blind end of the cylinder 116. A suitable reversing switch can also be included for the motor 110.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. Apparatus for handling signature bundles comprising a generally U-shaped frame including two spaced legs and horizontal frame members connected to ends of said legs and extending parallel to one another, fluid-operated means carried by said frame for moving one of said legs and the corresponding horizontal frame member toward and away from the other of said legs and the other horizontal frame member, a clamping pad rotatably carried by each of said legs and located on a common axis, means carried by said frame for rotating one of said clamping pads, locating means carried by said frame for engaging a signature bundle to aid in centering said clamping pads relative to the signature bundle, means connecting said locating means to one of said horizontal frame members, said connecting means comprising a fluid-operated cylinder carried by the horizontal frame member and a piston rod extending from said cylinder and affixed to said locating means for moving said locating means from the locating position to a retracted position to enable a signature bundle carried by said apparatus to be rotated.

2. Apparatus for handling signature bundles comprising a generally U-shaped frame including two spaced legs and horizontal frame member means connected to ends of said legs, a first clamping pad supported by one of said legs, a second clamping pad supported by the other leg and located on a common axis with said first clamping pad, means carried by said frame for rotating said second clamping pad, fluid-operated means carried by said frame for moving one of said clamping pads toward and away from the other of said clamping pads, locating means carried by said frame for engaging a signature bundle to aid in centering said clamping pads relative to the signature bundle, means connecting said locating means to said horizontal frame means, said connecting means comprising a fluid-operated cylinder carried by the horizontal frame means and a piston rod extending from said cylinder and affixed to said locating means for moving said locating means from the locating position to a retracted position to enable a signature bundle carried by said apparatus to be rotated.

3. Apparatus for handling signature bundles comprising a U-shaped frame including a first leg, a second leg, and horizontal frame member means affixed to an end of said first leg and to an end of said second leg, a fluid-operated cylinder carried by said frame, a first clamping pad rotatably carried by said first leg and facing toward said second leg, a second clamping pad rotatably carried by said second leg and facing toward said first clamping pad, said first clamping pad being movable toward and away from said second clamping pad by said fluid-operated cylinder, moving means carried by said frame for turning one of said first and second pads, locating means, and power driven moving means connecting said locating means and said horizontal frame member means to position said locating means in a locating position at a predetermined distance from said horizontal frame member means to aid in locating a signature bundle relative to said frame and for moving said locating means from a retracted position to the locating position and from the locating position to the retracted position to enable a signature bundle carried by said apparatus to be rotated.

* * * * *